UNITED STATES PATENT OFFICE.

ALBERT G. GRIFFITH, OF BALTIMORE, MARYLAND.

IMPROVEMENT IN FERTILIZERS.

Specification forming part of Letters Patent No. 173,621, dated February 15, 1876; application filed May 20, 1875.

*To all whom it may concern:*

Be it known that I, ALBERT G. GRIFFITH, of the city of Baltimore and State of Maryland, have invented a new and useful Compound called "The Great American Fertilizer," which compound is fully described in the following specifications:

The invention relates to an improvement in soil-fertilizers of the class in which a suitable acid is employed to fix the nitrogenous matters contained in fecal substance, and thereby produce a compound which is so far free from noxious and offensive odors as to be adapted for handling and transportation in casks or boxes, like gypsum and other dry fertilizing substances.

Horse-manure forms the base or chief element of my compound, being possessed of the properties essential to attainment of the desired result. To one hundred pounds thereof I add from eighty to one hundred pounds of sulphuric acid, and thoroughly mix them; one hundred pounds of bone-dust and one hundred pounds of archilla, Curaçoa or Mexican guano, (whose chief chemical ingredients are phosphate of lime and ammonia,) are then admixed with the mass.

The dry granular product thus obtained is greatly condensed from the original bulk of its components, and combines the highest proportions of nitrogenous and mineral elements which can be united to form a practically safe fertilizer.

What I claim is—

The fertilizing compound, formed of horse-manure, sulphuric acid, bone-dust, and Mexican guano, combined in specific proportions set forth.

ALBERT G. GRIFFITH.

Witnesses:
   G. M. GRIFFITH,
   GEO. T. HINTON.